Oct. 30, 1934.   E. E. CARLSON   1,978,408
RUNPROOF OR RUN RESISTANT FULL FASHIONED STOCKING AND METHOD OF MAKING SAME
Filed Nov. 29, 1933   6 Sheets-Sheet 1

Inventor:
Ellsworth E. Carlson,
by Emery Booth, Vaughan Townsend
Attys

Oct. 30, 1934.  E. E. CARLSON  1,978,408
RUNPROOF OR RUN RESISTANT FULL FASHIONED STOCKING AND METHOD OF MAKING SAME
Filed Nov. 29, 1933  6 Sheets-Sheet 2
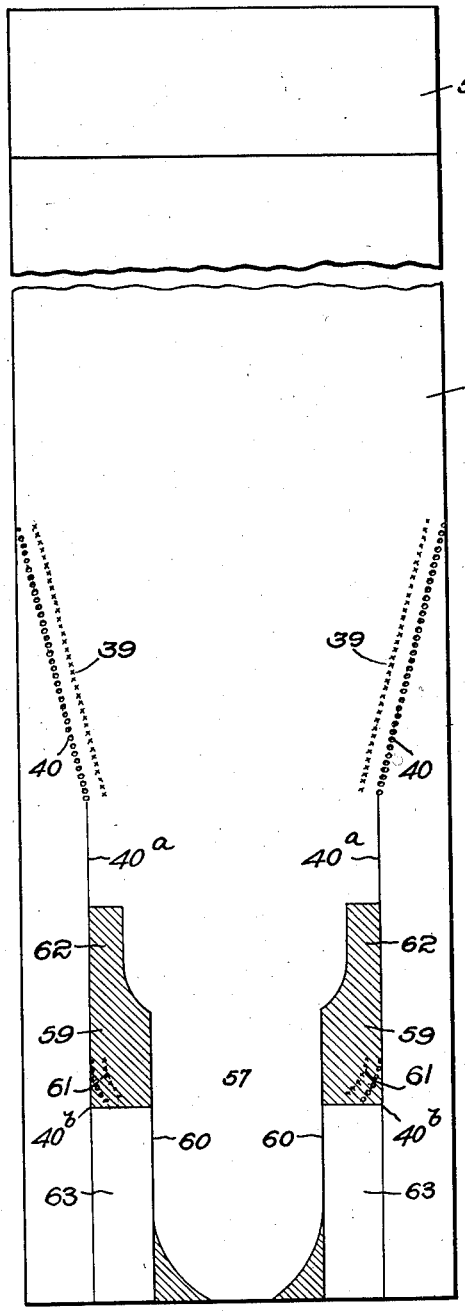
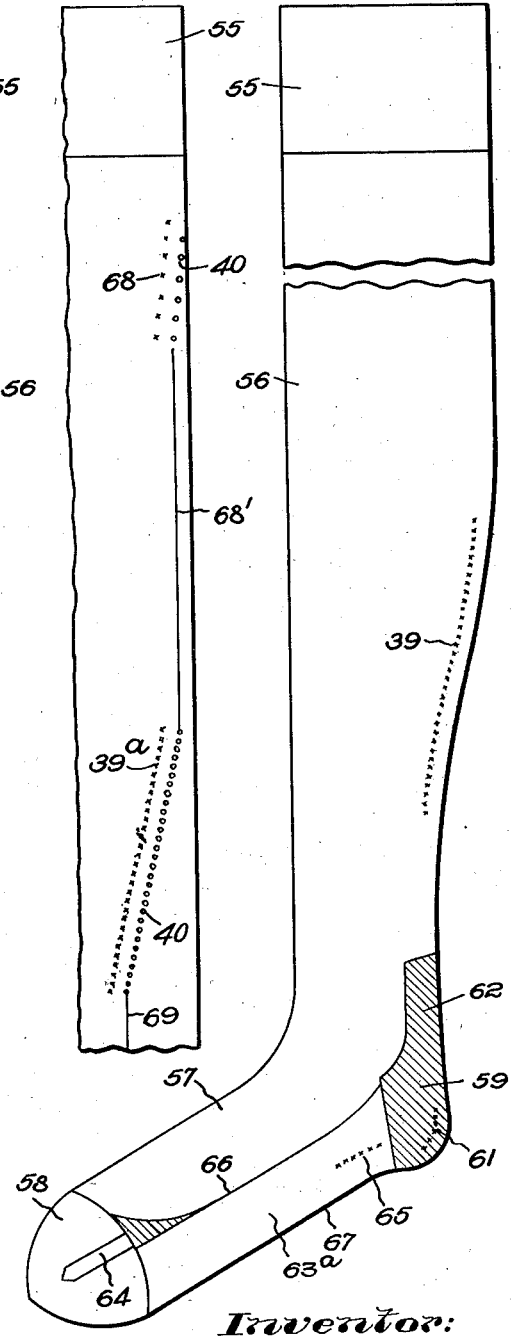

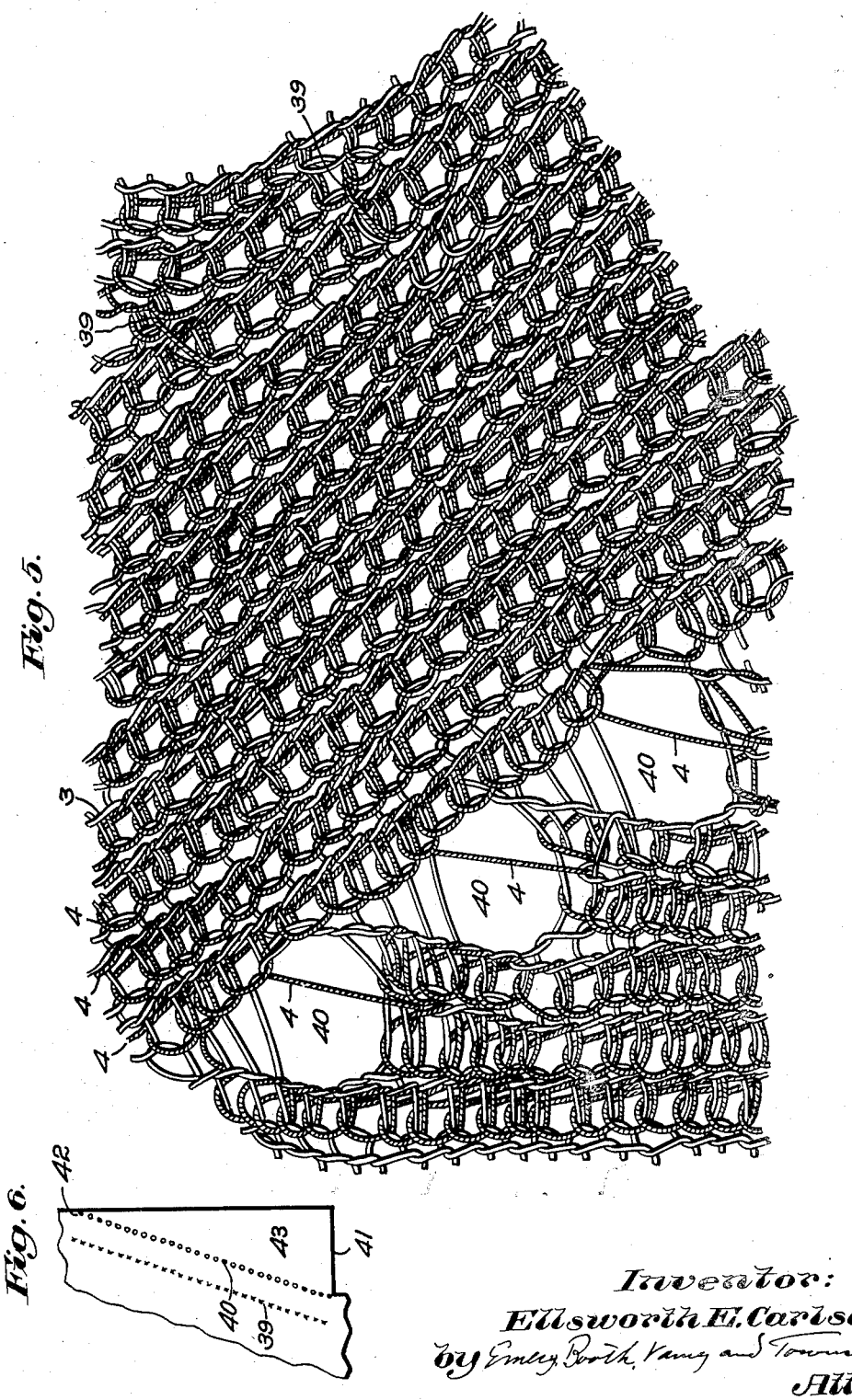

Oct. 30, 1934.  E. E. CARLSON  1,978,408
RUNPROOF OR RUN RESISTANT FULL FASHIONED STOCKING AND METHOD OF MAKING SAME
Filed Nov. 29, 1933  6 Sheets-Sheet 4

Inventor:
Ellsworth E. Carlson,
by Emery, Booth, Varney and Townsend
Attys.

Oct. 30, 1934.     E. E. CARLSON     1,978,408
RUNPROOF OR RUN RESISTANT FULL FASHIONED STOCKING AND METHOD OF MAKING SAME
Filed Nov. 29, 1933     6 Sheets-Sheet 5
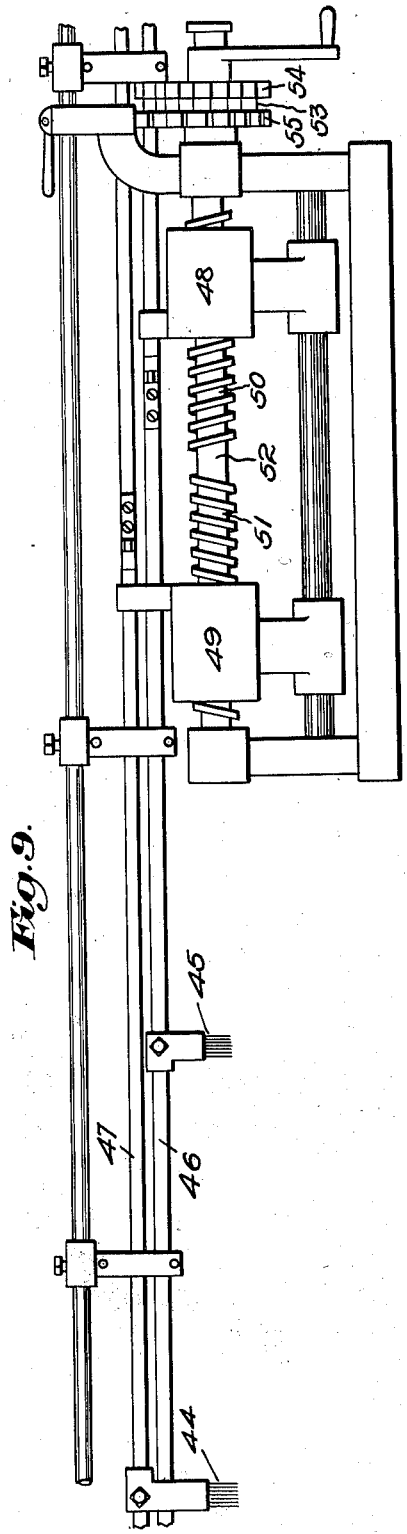
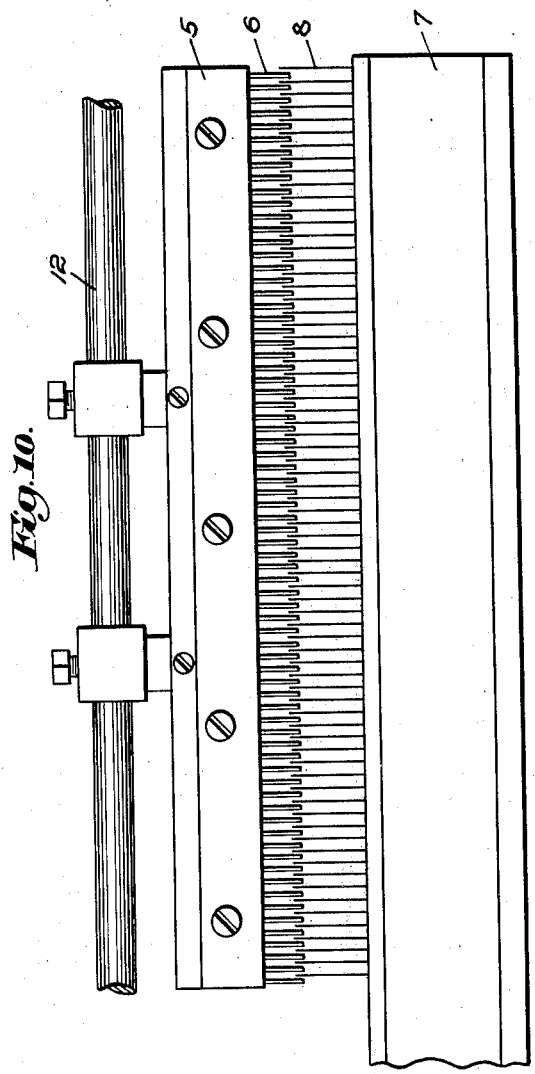
Inventor:
Ellsworth E. Carlson,
by *Attys.*

Oct. 30, 1934.    E. E. CARLSON    1,978,408
RUNPROOF OR RUN RESISTANT FULL FASHIONED STOCKING AND METHOD OF MAKING SAME
Filed Nov. 29, 1933    6 Sheets-Sheet 6
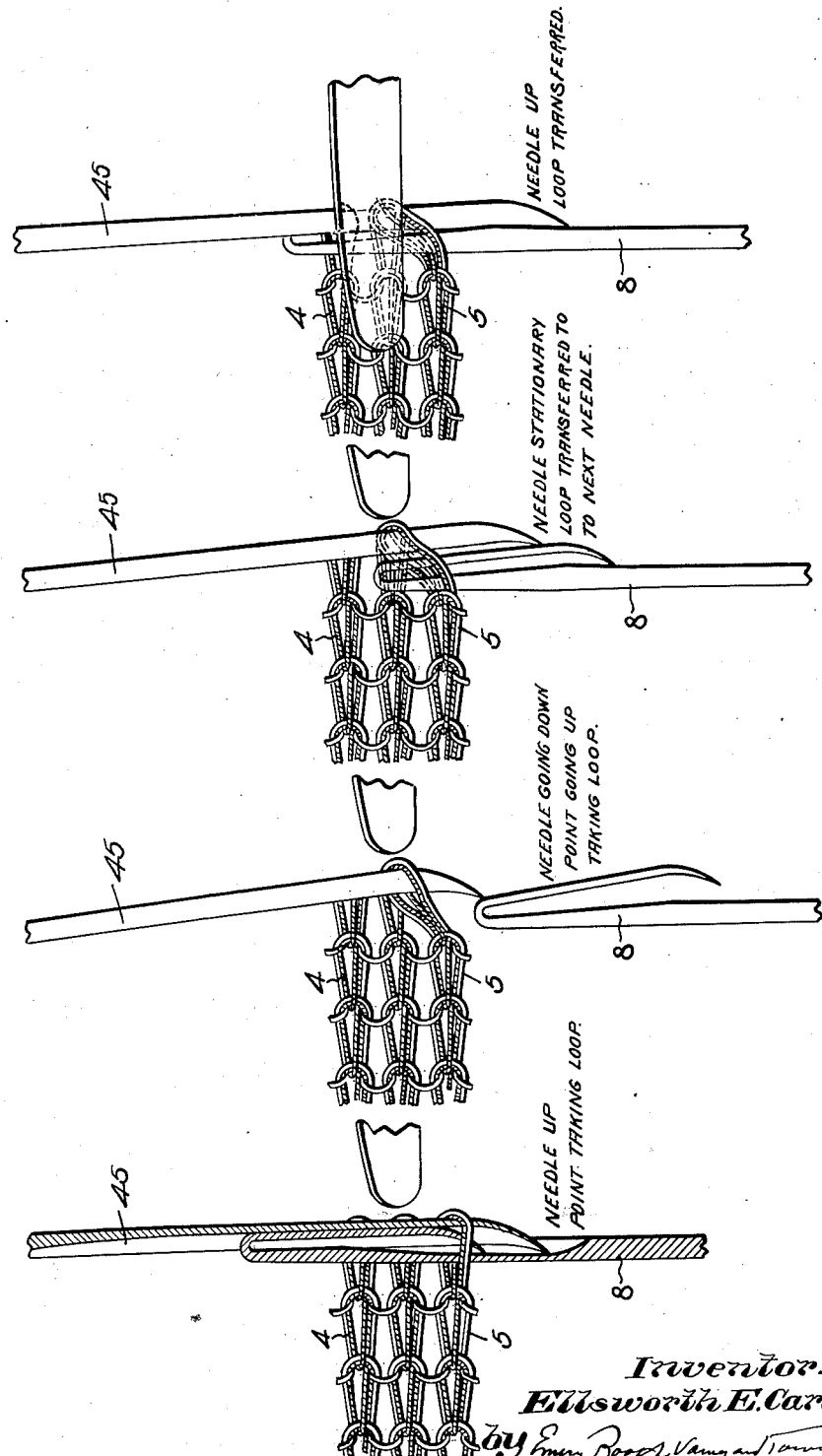
Inventor:
Ellsworth E. Carlson Patented Oct. 30, 1934

1,978,408

UNITED STATES PATENT OFFICE 1,978,408

RUNPROOF OR RUN-RESISTANT FULL-FASHIONED STOCKING AND METHOD OF MAKING SAME

Ellsworth E. Carlson, Saratoga Springs, N. Y., assignor to Van Raalte Company, New York, N. Y., a corporation of New York Application November 29, 1933, Serial No. 700,193

11 Claims. (Cl. 66—172)

This invention relates to run-proof or strongly run-resistant full-fashioned (that is, flat-knit) stockings and to the method of making the same.

This application is, as to all common subject-matter, a continuation of my co-pending application Ser. No. 541,245, filed June 1, 1931, for run-proof full-fashioned hosiery, etc. It is also, as to all common subject-matter, a continuation of and is in part a division of my co-pending application Ser. No. 613,244, filed May 24, 1932, and Ser. No. 645,919, filed December 6, 1932.

I do not in this application generically claim my invention which, both generically for non-run full-fashioned hosiery and specifically as to another species than that herein disclosed and claimed, is claimed in my said co-pending application Ser. No. 541,245.

In the present application the claims are directed to full-fashioned hosiery rendered run-proof or strongly run-resistant by reason of warp threads knitted into the respective needle wales thereof, the stocking being fashioned by lateral transfer of stitches composed of the respective warp threads and the main or weft knitting thread. I do not, however, in this application claim generically, either as to stocking, stocking blank or method, the feature, herein disclosed, of laterally transferring stitches composed of the main or weft knitting thread and the respective warp threads, since the same is broadly or generically claimed in my co-pending application Ser. No. 743,531, filed September 11, 1934, as a division in part of my said co-pending application Ser. No. 645,919 and as a continuation as to common subject matter of my said co-pending application Ser. Nos. 541,245 and 613,244. In this present application the claims are directed to that species of my invention which involves the knitting of the stocking blank of full width either to the toe or at least past the calf or ankle narrowings, for subsequent trimming away outside of said narrowings.

In order that the principle of the invention may be readily understood, I have disclosed a single embodiment and a slight modification of that specific form of my invention just above referred to and have illustrated sufficient mechanism to explain or make it clear how my invention herein claimed is practised.

For a complete disclosure of the preferred embodiment of mechanism for knitting the full-fashioned stocking of my invention and for carrying out the method of my invention, I make reference to my co-pending application Ser. No. 723,298, filed May 1, 1934.

In said drawings,—

Fig. 3 is a plan view of a blank of a full-fashioned stocking constructed in accordance with my invention and having the described narrowings by lateral transfer of stitches at certain desired points hereinafter referred to, said blank containing parts that are subsequently to be trimmed away;

Fig. 3a is a detail showing a modification wherein narrowings are also provided near the upper part of the stocking below the welt;

Fig. 4 is a side elevation of the completed stocking shown in plan or as a blank in Fig. 3;

Fig. 5 is a plan view of a portion of the fabric of the stocking at certain of the narrowings, said view corresponding to a photograph of the fabric as made by a microscopic camera;

Fig. 6 is a detail in plan view representing a small portion of the fabric at certain of the narrowings as made in accordance with a slight modification of my invention;

Fig. 9 is a front elevation of means for moving the narrowing points in a full-fashioned machine for practising my invention;

Fig. 10 is a detail, with parts broken away, of some of the warp thread guides and needles of a full-fashioned knitting machine for practising my invention and Figs. 11, 12, 13 and 14 are vertical sectional views upon a large scale to show different steps or stages in the act of transferring stitches each composed of a portion of a warp yarn or thread and of the main knitting yarn or thread.

Figure 1:
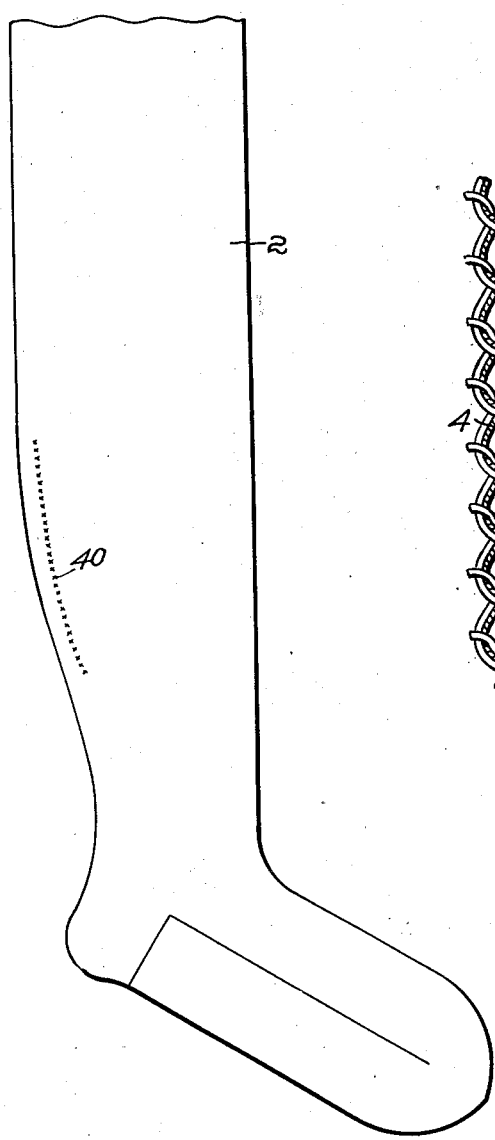
Fig. 1 is a side elevation of a completed full-fashioned stocking made in accordance with my invention herein claimed, the upper part thereof being broken away.

The knitted fabric is a plain flat-knit fabric made upon a full-fashioned hosiery machine preferably having a large number of sections upon each of which a stocking leg, or if desired a stocking leg and foot, is knitted. Any suitable hosiery yarn or thread may be employed as the main yarn or thread, as, for example, silk, artificial silk, rayon, cotton or wool. In Fig. 1, I have represented at 1 the blank which includes part of the leg, the ankle and the heel. It will be understood that the stocking, the upper part of which is represented as broken away in Fig. 1, has a welt at the upper end which, so far as this invention is concerned, may be generally of the usual type, but to which my invention is not limited. The yarns or threads may be changed from time to time in knitting the stocking, as may be necessary, for example, at the end of the welt. Also reinforcing yarns may be introduced at the desired points, as, for example, in the heel and in the sole, and at the toe.

Figure 2:
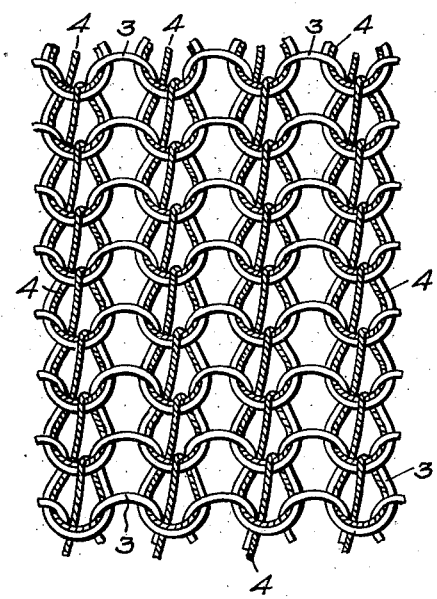
Fig. 2 is a detail upon a very greatly enlarged scale, of the outer face of the fabric to show the main yarn or thread and the additional or warp yarns or threads which are introduced into all the needle wales in order to make the fabric run-proof or run-resistant.

In Fig. 2, I have at 3 indicated the stitches or loops made by the main knitting yarn or thread. A fabric made only as indicated by the yarn 3 is not run-proof or run-resistant. It is the purpose of my invention to make a fabric which is run-proof in both directions or run-resistant throughout the entire extent thereof. This I accomplish, in accordance with the disclosed embodiment of my invention, by introducing into each needle wale a separate yarn or thread, four of which are shown in Fig. 2 at 4, said threads 4 being hereinafter referred to as warp threads.

Figure 7:
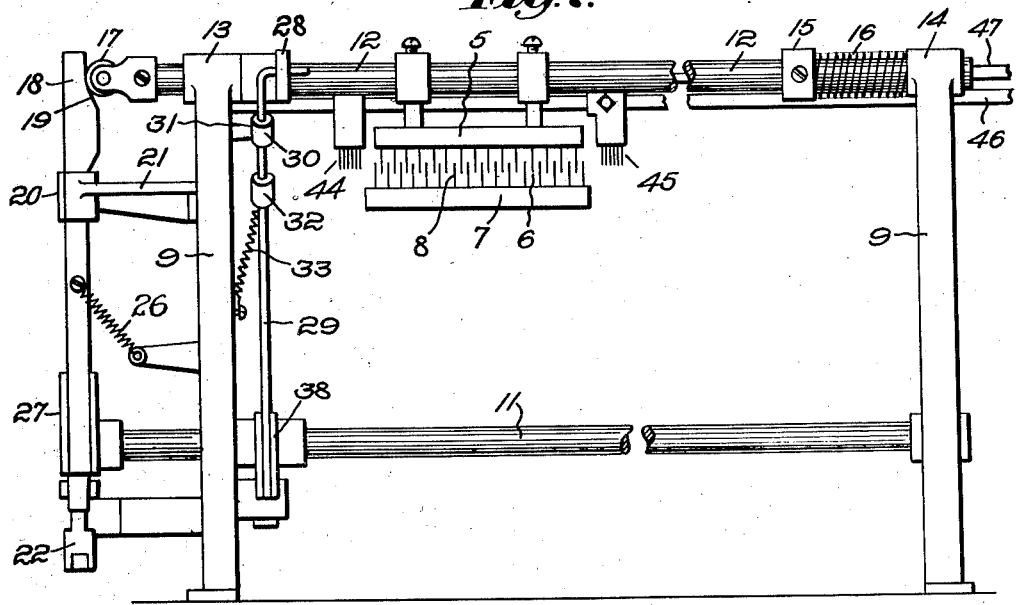
Fig. 7 is a front elevation (somewhat diagrammatic) of parts only of a full-fashioned knitting machine by which my invention may be practised to show how the movements are imparted to a guide bar thereof for the additional or warp yarns or threads, and indicating the narrowing mechanism.

Each of the yarns or threads 4, which themselves may be of any suitable material but are preferably silk, is introduced by means of a guide bar indicated at 5 in Fig. 7 and having the yarn or thread guides 6, one for each needle, the latter being spring beard needles. The said guides are mounted in suitable relation to the needle bar 7 and the needles 8 thereof. The guides and the needles are shown merely diagrammatically, and not for the purpose of showing the actual number or the actual spacing thereof.

It will be understood that the number of needles and the number of guides are sufficient for the purpose of knitting the stocking and that as many heads or units will be provided in the machine as may be necessary. The main yarn or thread 3, which I also refer to as the weft thread, is introduced in the manner usual in full-fashioned machines, being traversed from edge to edge of each section of the fabric, and the loops or stitches of the said main yarn or thread are formed in the usual manner in full-fashioned machines.

As shown most clearly in Fig. 2, each yarn or thread 4 is introduced into all the loops of its own needle wale only. The knitting yarn or thread 3, as stated, is introduced in the usual manner by a yarn guide that is traversed back and forth the entire width of the fabric. As herein described and claimed in combination with the feature of knitting the blank of full width at least past the narrowings, the fashioning of the fabric is effected by the lateral transfer of loops or stitches composed respectively of portions of the corresponding warp threads and portions of the main or weft thread, instead of by successively shortening the traverse of the yarn guide for the main knitting yarn or thread, as specifically claimed in my said application Ser. No. 541,245, the action of the transfer points, needles and sinkers in or during the making of such transfer being shown upon an enlarged scale in Figs. 11 to 14 hereinafter more fully referred to.

As shown in Fig. 2, each yarn or thread 4 lies in parallelism with the loop of the main knitting yarn or thread 3 inside the same, and at the top of the loop the yarn or thread 4 passes to the back of the previous loop and the portion of the yarn or thread 4 therein, and then passes in front of the same down through the next loop when the same has been completed, passing to the back of such loop and then participates in the formation of the next loop in the next course, and the described operation is continued from course to course. The said yarns or threads 4 do not enter into or become incorporated in the sinker wales.

Each and every needle stitch is accurately measured by reason of the fact that in full fashioned machines, the sinkers and dividers apportion accurately the amount of thread which shall enter into each needle loop and the spring beard needles are all drawn down together. This avoids the inevitable slight robbing incident to the production of circular knit fabrics made by independently operated needles.

Inasmuch as each and every needle stitch or loop is thus accurately measured and its size determined upon, I am enabled in the practice of my invention to apportion coordinatingly each needle loop or stitch of each warp thread, as to the length of thread constituting the same, to the accurately measured corresponding needle loop or stitch of the body or weft thread. The result is that the normal lateral expansibility of the entire stocking incident to the drawing of the sinker loops upon the cooperating needle loops in use of the stocking is fully preserved notwithstanding the non-run character of the stocking, by reason of the said apportionment of the proper amount of one of the warp threads to each measured corresponding needle loop or stitch of the main body or weft thread.

In order to incorporate the said yarns or threads 4 with the main knitting yarn or thread 3, I impart to the support for the guide bar 5 a longitudinal movement (that is, one lengthwise of the machine) and also a rocking movement (that is, one transverse to the needles). The construction is preferably such that each yarn or thread guide 6 enters between two needles from rear to front, is then moved lengthwise of the machine a distance of one needle, is then swung rearwardly so that each such yarn guide 6 passes between the next two needles, and is then moved longitudinally in the opposite direction, thereby completing the square or rectangle.

In order to impart the described movements I provide mechanism sufficiently illustrated in Fig. 7, but inasmuch as the same is not herein claimed, it is unnecessary to illustrate the same in detail herein, but the details of mechanism for the purpose are disclosed in my said co-pending application Ser. No. 723,298.

Sufficient of the framing is indicated in Fig. 7 at 9, the same constituting uprights and cross members. In the framing is suitably mounted the cam shaft 11 driven in any suitable manner, and thereon are mounted suitable cams to impart both an axial movement and a rocking movement to a shaft 12 suitably mounted in the upper part of the framing in parallelism with the cam shaft 11. Said axially movable or sliding shaft 12 has suitably secured to and depending therefrom all of the guide bars 5 hereinbefore referred to and only one of which is shown in Fig. 7, the said shafts 11 and 12 being broken away so that only a small part of the entire machine is shown. The purpose of imparting both an axial or sliding movement and a rocking movement to the shaft 12 is to impart the desired movements to the series of thread guides 6 as described. It will be understood that the shape of the cams or other means for imparting the axial movement and rocking movement to the shaft 12 is varied in accordance with the exact extent and character of said movements, the purpose of the movements being to introduce the series of yarns or threads 4 to the needles so that the said yarns or threads 4 will be incorporated into the fabric as already described.

For imparting the described movements to the shaft 12 any suitable means may be used. The said shaft 12 is mounted for axial or sliding movement in bearings 13, 14 of the framing and secured thereto is a collar 15 between which and the bearing 14 is a suitable coiled spring 16 tending to slide the shaft 12 to the left viewing Fig. 7. At the opposite end of said shaft 12 is secured a roll 17 which takes against a slide 18 having a cam surface 19. The said slide 18 is mounted for vertical sliding movement in the bearing 20 suitably shaped to accommodate the movements of said slide. Said bearing 20 is provided in a guide bracket 21 secured to one of the uprights 9 of the framing; said slide 18 at its lower end is pivotally secured at 22 to a suitable lever pivoted in the framing and having a cam roll held by spring 26 constantly in engagement with a cam 27 fast upon and rotating with the cam shaft 11. The contour of the cam 27 is such as to impart the necessary sliding or axial movements to the shaft 12, so that the yarns or threads 4 will be suitably introduced to the needles which are desirably of the spring beard needle type, customary in full-fashioned hosiery machines.

In order to impart rocking movement to the said shaft 12, the latter has fast thereon an arm 28 laterally extending therefrom and having pivotally connected thereto a rod or link 29 which is mounted for up and down or sliding movement in a bearing 30 upon a guide bracket 31 secured to the frame. The said rod or link 29 has connected thereto a collar 32 to which is connected one end of a coiled spring 33, the other end being secured to the framing of the machine. To the lower end of the rod or link 29 is pivotally secured a lever having a roll bearing against the periphery of a cam 38 fast upon the cam shaft 11. Said roll is held constantly in engagement with said cam 38 by the spring 33 and the contour of said cam is such as to impart the necessary rocking movements to the shaft 12 to insure the laying of the threads or yarns 4 in the needles as already described.

The number of the said threads or yarns 4 is the same as the number of active needles (that is, the same as the greatest number of needles active at any time in the production of the hosiery fabric). The number of guides 6, of course, is the same as the total number of threads or yarns 4. While I have referred in detail to certain mechanism for operating the shaft or support 12 with its complete set of guide bars 5 for the warp thread guide 6, so as to impart to the said shaft or support 12 an endwise movement and also a rocking movement to lay or position the respective warp threads 4 in loops at each needle in each course, such showing of mechanism in this application is intended to be indicative merely generally of mechanism to be used for the purpose, and for a more complete disclosure of the details of the mechanism which I prefer to employ and by which the same purpose is accomplished, I refer to the disclosure in my said co-pending application Ser. No. 723,298, wherein the mechanism is claimed.

The foot of the stocking may be made in any suitable manner and may be made directly upon the machine herein disclosed or the leg may be transferred to a footer. Preferably the foot is of the English full-fashioned type with seams upon the sides of the foot, but my invention is not limited to such character of foot.

In order to make the full-fashioned stocking herein claimed, I do not proceed by automatically shortening the traverse of the main thread carrier as specifically disclosed in my said co-pending application Ser. No. 541,245, but I provide narrowing points which enter the desired or selected stitches or loops each composed of the main thread 4 and one of the warp threads 3 and transfer the same laterally. This I do by means which I will specifically describe and which are represented in Fig. 9, and Figs. 11 to 14 so as to produce the fabric structure represented (with respect to one form) in Figs. 5 and 6, the latter showing a slight modification to which my invention is not limited.

It will be understood that the ankle or lower calf portion of the stocking is shaped or fashioned. This is preferably done as follows, reference being particularly made to Figs. 5, 6 and 9.

The knitting, as indicated in part in Fig. 6 and also as indicated in Figs. 3 and 4 to be hereinafter more fully referred to, is continued from the top or welt of the stocking either of the full width throughout as shown in Fig. 3 or to a point just below the inclined lines of narrowings 39 in Fig. 6, and the inclined lines of openings 40 of the calf or ankle portion (to be more fully referred to) and then if I proceed as indicated in Fig. 6, the knitting is continued for a narrower fabric beginning at the transverse line 41, which narrower fabric would be of sufficient width to provide for the instep as well as the heel tabs and the part of the fabric directly in longitudinal line with said heel tabs. Instead, however, the knitting may be continued of the full width as shown in Fig. 3, more fully hereinafter referred to.

The stitches at the points where the fashioning or narrowing is to be provided (whether in the calf or ankle portion or at or in proximity to the heel or elsewhere) are transferred inward as indicated in Figs. 5 and 6 at 39 by means of narrowing points which may be of the usual number at each side or edge of the blank. Each stitch is transferred in to the extent of one or two needles, desirably not more than two, but the traverse of the main thread carrier is continuous for the full width of the fabric down to at least the line 41. Inasmuch as the warp threads 4 introduced by the endmost warp guides 6 and those near thereto remain in action, it will be evident that the warp threads 4 continue to be supplied to the same identical needles as before, although certain stitches are laterally shifted inward, as indicated at 39. The result is to provide an inclined line of small openings 40 along each side of the fabric from, say, the point 42 down to the transverse line 41, or elsewhere, and to position the needle wales along inclined lines between each line of narrowings 39 and the adjacent line of openings 40, with the result that after the blank has been trimmed along said lines of openings 40, the two resulting edges are, by the seaming operation, seamed together lengthwise of or along said wales and not across wales, as would be the result if a fabric, knitted without transfer of stitches as described, were cut on inclined lines across wales and then seamed together, which would not give so satisfactory a seam and would also lack the characteristic appearance of full fashioned hosiery.

In Fig. 5, there is represented the structure of the resulting fabric, and it will be observed that each of said openings 40 is traversed by one warp thread, such threads becoming at once incorporated in the further knitting of the fabric in the triangular portions 43, one of which is indicated in Fig. 6. After the knitting of the entire blank has been completed, whether it be of the form indicated in Fig. 3 or in Fig. 6, I trim off each edge of the blank along the line of holes 40 wherever they occur. This leaves entirely acceptable edges because of the non-run character of the fabric and the lateral transfer of the stitches, and the two inclined edges are then seamed together in any suitable manner. I may narrow or fashion by transferring the stitches to the extent of one or of two needles. So far as I am aware, it is new in the art to transfer both warp threads and the main knitting thread, and such feature is broadly claimed by me in my said co-pending application Ser. No. 743,531, filed Sept. 11, 1934.

The two sets of narrowing points for one section of the machine are indicated at 44, 45 in Figs. 7 and 9, and one of the narrowing points 45 in several stages of its movement in transferring the stitches, as described, is shown in Figs. 11 to 14. The narrowing points are mounted in a manner substantially that of the well known Reading machine, as, for example, in the parts catalog of the Reading Full-Fashioned Knitting Machine, of Reading, Pa., copyrighted 1929, except that, if desired, when the end of the leg narrowings is reached, the traverse of the main thread carrier is or may be abruptly shortened at each end of its stroke as indicated in Fig. 6.

The said narrowing points are mounted in a manner substantially that of the said Reading machine, so that the proper dipping movements may be imparted thereto. For explanation of the means for providing such dipping movement, reference is made to the said Reading machine and to the said catalog.

The said narrowing points 44, 45 may be moved in any suitable manner to effect the transfer of stitches indicated in Figs. 5 and 6. For this purpose, I have in Fig. 9 indicated two bars 46, 47 supported as shown and which are respectively connected to nuts 48, 49 upon the oppositely threaded portions 50, 51 of the shaft 52, which, by means of the ratchets 53, 54 is turned in opposite directions at the proper times automatically. A holding wheel 55 is also provided upon said shaft 52. The relation of each transfer or narrowing point to the needle to which is transferred the stitch composed of a loop of a warp thread and a loop of the main knitting thread and the relative position of the sinker for that needle at different stages of the transferring action, is shown in Figs. 11 to 14, being that shown in my said co-pending application Ser. No. 723,298.

It will be understood that the transverse of the main thread carrier across the bank of needles starts substantially simultaneously with the commencement of the thread laying operation of the warp threads 4. Each warp thread 4 is laid once about its needle for each course of the main knitting thread, whether that course starts from the right or from the left end of the bank of needles. The knitting needles commence their descent immediately after each course of the main knitting thread 3 is laid. The warp threads 4 are wrapped about their respective needles when the latter are in their highest position.

Figure 8:
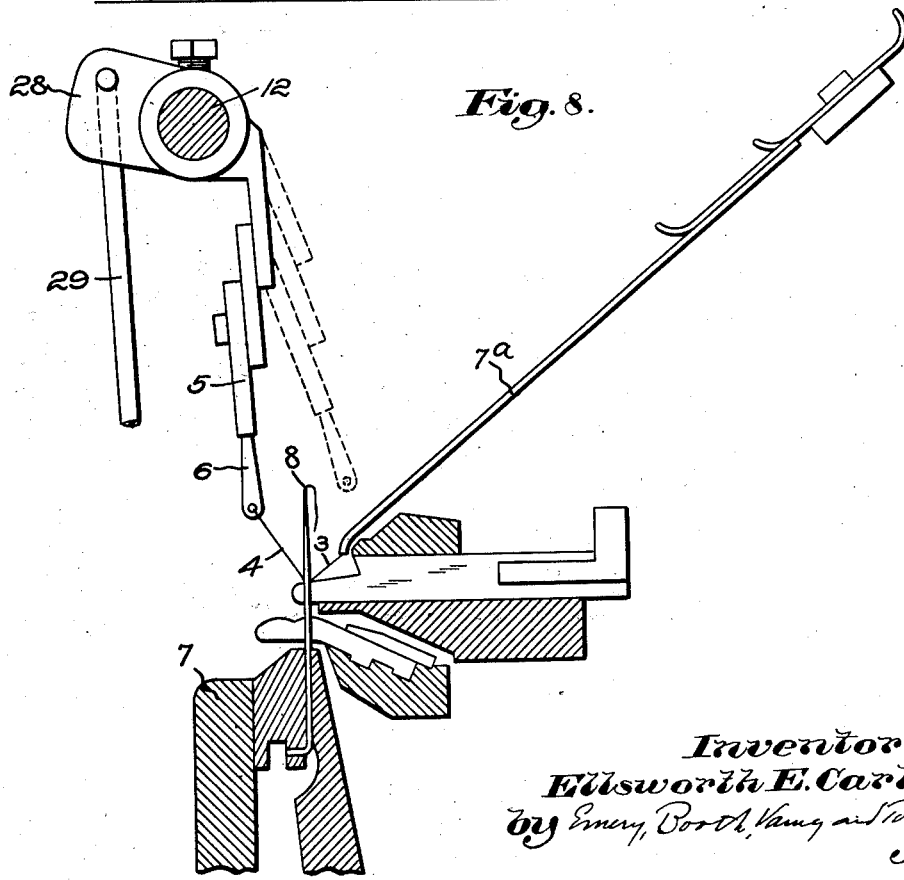
Fig. 8 is a vertical sectional view upon an enlarged scale of the needles and immediately cooperating parts including the main thread carrier and one of the warp thread fingers, the narrowing points being omitted.

The relation of the fingers 6 of the warp guide bar 5, the main thread carrier 7a and the needles 8 is shown most clearly in Fig. 8.

In Figs. 3 and 4, I have represented in plan the blank of a stocking (shown in side elevation in Fig. 4) knitted in the manner hereinbefore described, but wherein the knitting of the material of the full width of the fabric is not terminated at a line 41 directly below the calf narrowings 39, as in Fig. 6, but is continued down to the toe.

In Figs. 3 and 4, the top welt of the full-fashioned stocking is represented at 55, and it will be understood that the warp threads 4 may be introduced into the fabric from the very commencement thereof (that is, at the very commencement of the welt), or the welt may be made in the usual manner and turned or closed, and thereupon a lighter main knitting thread may be substituted. The leg of the stocking is represented at 56. In Figs. 3 and 4, the ankle or lower calf portion is shaped or fashioned. The knitting is continued of full width throughout, when making the blank as shown in Fig. 3, and the narrowings are provided in the calf or ankle portion at 39, 39, as already described. The knitting of the fabric is continued parallel sided as shown in Fig. 3. The instep or top of the foot portion is indicated at 57, the warp threads 4 continuing without interruption from the top of the stocking down the leg and instep to the toe 58. The heel tabs are indicated at 59, 59, and at 60, 60 I have indicated the lines where the blank will be cut to form the sides of the instep. The fabric of the heel is narrowed at 61, 61, by transferring the stitches thereof composed of the main knitting thread and the warp threads. The high splice portions are indicated at 62, 62 and are provided by the usual adidtional traversing weft thread carriers controlled in the usual manner. The sole portions of the stocking blank or foot are indicated at 63 in Fig. 3, and the toe portion 58 is provided with the customary narrowings 64. The blank of Fig. 3 is trimmed along the openings 40, then along the lines 40a, 40a to the points 40b, 40b then the parts 63 are trimmed away along the lines 60, 60. The blank is then transferred to a footer, the heel tabs 59 being turned outwardly, and the foot portions 63a are then knitted in continuation of the sides of the heel tabs, the toe 58 with its narrowings 64 being knitted on said footer, narrowings 65 being provided in said foot portions.

It is to be understood that the stocking represented in Fig. 4 is seamed along both sides of the foot as indicated at 66 and also along the bottom of the foot as indicated at 67.

If desired and as shown in Fig. 3a, narrowings may be provided at the upper portion of the stocking below the welt, as indicated at 68, by transferring inwardly stitches composed of the main knitting thread and the corresponding warp threads in a manner already described. In such case the narrowing 39 for the calf or ankle portion will commence further inward as indicated at 39a in Fig. 3a. The fabric after the same has been completed of the full width will be cut along the lines of the openings 40 and straight lines connecting the same, such as indicated at 68', 69 in Fig. 3a. It will, of course, be understood that I have not attempted in the figures of the drawings, as, for example, Figs. 3, 3a and 4, to show each narrowing, as to do so would require that the figures be of the same size as the hosiery itself.

I am aware of the German patent to Schubert & Salzer, No. 190,196, October 1907, and the corresponding French Patent No. 370,659, for improvements on Thread fingers actuated by a jacquard pattern for use in flat knitting, but therein the warp thread fingers that would supply warp threads at the selvage portions of the fabric are rendered entirely inactive when reductions in width are made; in other words, such reductions in width of the fabric as are made are effected only as to stitches composed entirely of the main knitting thread. I am also aware of the suggestion in the provisional specification of the British patent to Wildt, No. 327,988 (complete specification accepted April 8, 1930) that the Wildt invention is "also applicable to flat-frame machines", but (aside from the fact of the late effective filing date thereof) there is no disclosure in said patent of narrowing by lateral transfer of stitches composed of both the main knitting thread and warp threads.

I am also aware of the British patent to Doehner, No. 308,331, but the same contains no disclosure of narrowing by lateral transfer of stitches composed of both the main knitting thread and warp threads, and moreover each warp thread of said patent extends into two and three adjacent needle wales and the intervening sinker wales. I am also aware of the U. S. patent to Levy, No. 1,783,847, December 2, 1930, for a "Fashioned warp knitting machine", but which does not use a weft thread, and therefore the stitches which are transferred are composed wholly of warp threads, and therefore entirely lacks disclosure of stitches each composed of a portion of the main knitting or weft thread and a warp thread. The fabric made in accordance with the disclosure in the said patent to Levy is not of a non-run character. Moreover, Levy, by withdrawing from action the needle from which a warp loop is transferred, makes at such point an open work fabric shown in Fig. 5.

I am also aware of the United States patent to Chase, No. 226,595, for a Knit fabric, not, however, for hosiery of any type, and of the companion Chase circular knitting machine Patent No. 216,619, describing the said fabric as for fire hose rendered water-tight by the use of warp threads.

Having thus described one illustrative embodiment of the full-fashioned stocking of my invention and means for making the same, it is to be understood that although specific terms are employed, they are used in a generic and descriptive sense and not for purposes of limitation, the scope of the invention being set forth in the following claims.

I claim

1. That method of knitting a substantially fully laterally expansible, run-proof or strongly run-resistant flat-knit stocking which include knitting the blank for at least the leg of the stocking by forming loops course by course from a body thread and a separate warp thread for substantially each needle wale from edge to edge of said blank; fashioning the stocking by laterally transferring stitches each comprising a loop of the body thread and a loop of the warp thread in each wale from which lateral transfer is made; continuing the knitting of the fabric blank past the calf or ankle narrowings of substantially the full width of the blank and thereafter trimming away the edge portions of the blank at least outside of the said calf or ankle narrowings; completing the foot portion including heel and toe, and thereafter seaming or securing together the edges of the fabric blank.

2. A run-proof or run-resistant plain-flat-knit stocking blank comprising a main or body thread and a series of warp threads knitted into and extending lengthwise the needle wales, said stocking blank having stitches composed of the main thread and of contained warp threads laterally transferred at the leg narrowings and thereby providing inclined lines of openings paralleling said narrowings, said blank being knitted of the full width down to the toe, for subsequent trimming.

3. A run-proof or run-resistant plain-flat-knit stocking blank comprising a main or body thread and a series of warp threads knitted into and extending lengthwise the needle wales, said stocking blank having stitches composed of the main thread and of contained warp threads laterally transferred at the leg narrowings and thereby providing inclined lines of openings paralleling said narrowings, said blank being knitted of the full width down to the toe, for subsequent trimming, said blank being adapted to be subsequently trimmed away along said inclined lines of openings and along parallel lines outside the heel tabs and along parallel lines at the sides of the top of the foot.

4. A run-proof or run-resistant plain-flat-knit stocking blank comprising a main or body thread and a series of warp threads knitted into and extending lengthwise the needle wales, said stocking blank having stitches composed of the main thread and of contained warp threads laterally transferred at the leg narrowings and thereby providing inclined lines of openings paralleling said narrowings, said blank being knitted of the full width down to the toe, for subsequent trimming, said blank being adapted to be subsequently trimmed away along said inclined lines of openings and along parallel lines outside the heel tabs and along parallel lines at the sides of the top of the foot, said blank having knitted thereonto the sides or bottom of the foot and the toe.

5. A run-proof or run-resistant plain-flat-knit stocking blank comprising a main or body thread and a series of warp threads respectively knitted into and extending respectively lengthwise of substantially all the needle wales, so as to render the fabric run-proof or strongly run-resistant and each restricted to one needle wale, said stocking blank having leg narrowings, comprising laterally transferred stitches each composed of a portion of the warp thread and of the main thread, said stocking blank being knitted of full width substantially throughout said narrowings and adapted to have trimmed edges outside said narrowings and along the sides of the ankle and the top of the foot, seamed together.

6. A run-proof or run-resistant plain-flat-knit stocking blank comprising a main or body thread and a series of warp threads knitted into and extending lengthwise the needle wales, one warp thread to substantially each needle wale and restricted thereto, said stocking blank having stitches composed of said main thread and of the contained warp threads laterally transferred at the leg narrowings, thereby providing inclined lines of openings outside of and paralleling said narrowings, thereby providing acceptable structures for trimming, said blank being knitted of the full width down to the toe.

7. A run-proof or run-resistant plain-flat-knit stocking blank comprising a main or body thread and a series of warp threads knitted into and extending lengthwise the respective needle wales, said stocking blank being knitted of full width substantially throughout the leg narrowings and having stitches composed of said main thread and of contained warp threads laterally transferred at the leg narrowings and thereby providing inclined lines of openings paralleling said narrowings and presenting formations permitting the effective subsequent trimming away of the said material outside of said openings.

8. A run-proof or run-resistant plain-flat-knit stocking blank comprising a main or body thread and a series of warp threads knitted into and extending lengthwise the respective needle wales, said stocking blank having stitches composed of said main thread and of contained warp threads laterally transferred at the leg narrowings and thereby providing inclined lines of openings paralleling said narrowings and presenting formations permitting the effective subsequent trimming away of the material outside of said openings, said blank being knitted of the full width down to the toe, and having heel tabs.

9. A run-proof or run-resistant plain-flat-knit stocking blank comprising a main or body thread and a series of warp threads knitted into and extending lengthwise the needle wales, said stocking blank being knitted of full width substantially throughout the leg narrowings and having stitches composed of the main thread and of contained warp threads laterally transferred at the leg narrowings, thereby providing oppositely inclined groups of needle wales outside of which the blank is adapted to be trimmed and the resulting edges seamed together.

10. A run-proof or run-resistant plain-flat-knit stocking blank comprising a main or body thread and a series of warp threads knitted into and extending lengthwise the needle wales, said stocking blank having stitches composed of the main thread and of contained warp threads laterally transferred at the leg narrowings, thereby providing oppositely inclined groups of needle wales outside of which the blank is adapted to be trimmed and the resulting edges seamed together, said blank being knitted of the full width down substantially to the toe, for said subsequent trimming.

11. A run-proof or run-resistant plain-flat-knit stocking blank comprising a main or body thread and a series of warp threads respectively knitted into and extending respectively lengthwise of substantially all the needle wales so as to render the fabric run-proof or strongly run-resistant, said stocking blank having leg narrowings consisting of laterally transferred stitches each comprising a portion of the warp thread and of the main thread, said stocking blank being knitted of full width substantially throughout said narrowings and adapted to have trimmed edges outside said narrowings, seamed together.

ELLSWORTH E. CARLSON.